(No Model.)
J. H. KIDDER.
COMBINED GAS AND OIL BURNER.
No. 266,631. Patented Oct. 31, 1882.
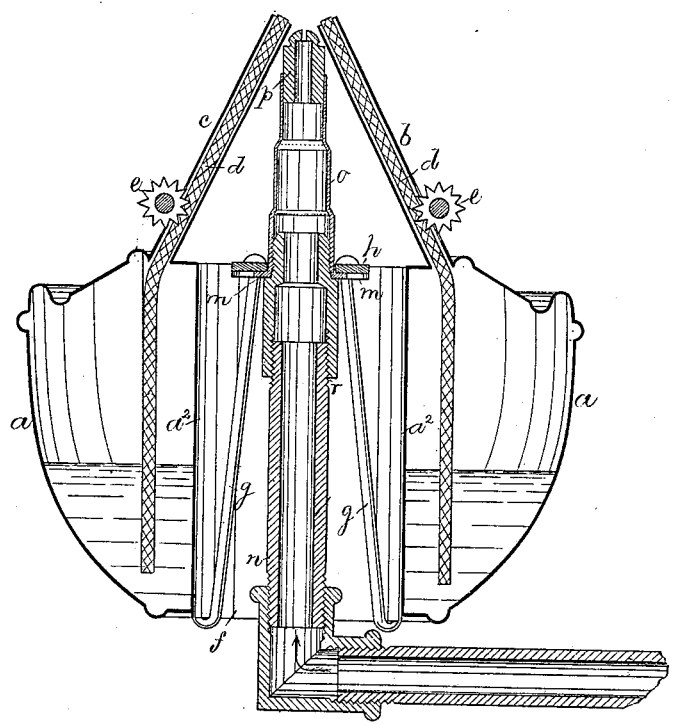
Witnesses.
Fred A. Powell
B. J. Noyes.
Inventor
James H. Kidder
by Crosby & Gregory
att'ys

UNITED STATES PATENT OFFICE.

JAMES H. KIDDER, OF LAWRENCE, MASSACHUSETTS.

COMBINED GAS AND OIL BURNER.

SPECIFICATION forming part of Letters Patent No. 266,631, dated October 31, 1882.

Application filed August 31, 1882. (No model.)

*To all whom it may concern:*

Be it known that I, JAMES H. KIDDER, of Lawrence, county of Essex, and State of Massachusetts, have invented an Improvement in Combined Gas and Oil Burners, of which the following description, in connection with the accompanying drawings, is a specification.

This invention relates to improvements in that class of lamps wherein a gas-flame is re-enforced by a flame produced from a liquid compound supplied by a wick; and my invention consists in the combination, with a gas-burner, of a lamp-body provided with a central air-passage, and with two wick-tubes arranged at opposite sides of the gas-burner, the lamp-body being supported by the gas-burner, the combined flames from the gas-burner and wicks producing a strong steady light without the employment of a chimney.

The drawing represents in vertical section a lamp embodying my invention.

The body $a$ of the lamp, of any suitable or usual shape externally, has properly secured to it two wick-tubes, $b\ c$, in which are placed wicks $d$, which extend down into the oil or other liquid substance capable of producing light when absorbed by the wicks and ignited. Each wick-tube has a wick adjusting or feeding device, $e$. (Shown as a toothed wheel of usual construction.) The body $a$ of the lamp has at its center an open passage, $f$, extending from bottom to top thereof, inside the inner wall, $a^2$, in which are placed several supports or wires, $g$, united at their lower ends to the lamp-body and at their upper ends with a washer, $h$.

The pipe $n$, in communication with any usual or suitable source for the supply of gas, such as commonly used to give light, has a union, $r$, upon which is screwed an ordinary gas-burner, $o$, provided with a bat-wing tip, $p$, of lava.

Between the burner and the union $r$ is a pronged washer, $m$, slotted to receive the wires $g$, and permit the washer $h$ to rest thereon and support the body $a$, which is to contain oil, so that the same may be readily applied to any burner and upright pipe $n$ long enough to extend through the open space $f$ at the center of the lamp.

In lamps affording light by a combined gas and oil flame two gas-jets have been employed, one at each side of a wick in a wick-tube, and the gas-pipes below the said gas-burners have been extended through the oil in the lamp, and have heated the same, so as to render the lamp dangerous and liable to explode.

To obviate heating the oil or liquid in the lamp from the burner and its connected heated metal pipe, I have provided the lamp-body $a$ with the central open passage, about which the air circulates freely up to the light-giving flame.

The wick-tubes are set at an inclination, as shown, so as to permit their wicks to come preferably a short distance above the top of the gas-burner, that the flame produced by the burning oil may commingle with the usual blue flame of the gas just above the tip.

This lamp is entirely safe. The body $a$ may be applied readily to any gas-burner, either for house or street lighting purposes, will burn steadily without a chimney, and will afford a given quantity of light at a less price than were all gas employed for a light of same strength.

I claim—

1. The lamp-body provided with the open central passage, and its two converging wick-tubes, $c\ d$, extending above the said lamp-body, and the gas-burner extended through the open central passage of the lamp-body and above it and between the wick-tubes, as shown, combined with means to support the lamp-body with relation to the gas-burner, all being arranged to operate as and for the purposes set forth.

2. The lamp-body $a$, having a central passage, $f$, and the wick-tube and the supports $g$, combined with the gas-burner, and a suitable connected washer or device to support the weight of the lamp-body, substantially as described.

In testimony whereof I have signed my name to this specification in the presence of two subscribing witnesses.

JAMES H. KIDDER.

Witnesses:
 Jos. P. LIVERMORE,
 FRED A. POWELL.